United States Patent
Martinez et al.

(10) Patent No.: US 8,582,757 B2
(45) Date of Patent: Nov. 12, 2013

(54) PROTECTION OF A CIPHERING ALGORITHM

(75) Inventors: Albert Martinez, Bouc Bel Air (FR); Yannick Teglia, Marseilles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 907 days.

(21) Appl. No.: 12/548,119

(22) Filed: Aug. 26, 2009

(65) Prior Publication Data

US 2010/0054460 A1    Mar. 4, 2010

(30) Foreign Application Priority Data

Aug. 28, 2008 (FR) ..................... 08 55765

(51) Int. Cl.
*H04L 9/06* (2006.01)
(52) U.S. Cl.
USPC ............. 380/28; 380/29; 713/172; 713/174; 713/194; 726/9; 726/20
(58) Field of Classification Search
None
See application file for complete search history.

(56) References Cited

U.S. PATENT DOCUMENTS

| | | | |
|---|---|---|---|
| 7,403,620 B2 | 7/2008 | Liardet et al. | |
| 2004/0028224 A1* | 2/2004 | Liardet et al. ................. | 380/37 |
| 2007/0014395 A1* | 1/2007 | Joshi et al. ...................... | 380/28 |
| 2007/0211890 A1* | 9/2007 | Gebotys .......................... | 380/28 |
| 2007/0286413 A1* | 12/2007 | Derouet .......................... | 380/28 |
| 2008/0019503 A1* | 1/2008 | Dupaquis et al. .............. | 380/28 |
| 2008/0253557 A1* | 10/2008 | Dottax et al. .................. | 380/28 |
| 2009/0086976 A1* | 4/2009 | Scian ............................ | 380/277 |
| 2009/0110187 A1* | 4/2009 | Fischer .......................... | 380/28 |
| 2010/0183142 A1* | 7/2010 | Katagi et al. ................... | 380/28 |

OTHER PUBLICATIONS

French Search Report dated Apr. 15, 2009, from corresponding French Patent Application No. 08/55765.

Mehran Mozaffari-Kermani et al, "A Structure-independent Approach for Fault Detection Hardware Implementations of the Advanced Encryption Standard" Fault Diagnosis and Tolerance in Cryptography, 2007. FDTC 2007. Workshop on, IEEE, Piscataway, NJ, USA, Sep. 1, 2007, pp. 47-53, XP031137890.

* cited by examiner

*Primary Examiner* — Jung Kim
*Assistant Examiner* — Adrian Stoica
(74) *Attorney, Agent, or Firm* — Wolf, Greenfield & Sacks, P.C.

(57) ABSTRACT

A method for protecting the execution of a ciphering or deciphering algorithm against the introduction of a disturbance in a step implementing one or several first values obtained from second values supposed to be invariant and stored in a non-volatile memory in which, during an execution of the algorithm: a current signature of the first values is calculated; this current signature is combined with a reference signature previously stored in a non-volatile memory; and the result of this combination is taken into account at least in the step of the algorithm implementing said first values.

15 Claims, 4 Drawing Sheets

PROTECTION OF A CIPHERING ALGORITHM

CROSS REFERENCE TO RELATED APPLICATIONS

This application claims the priority benefit of French patent application number 08/55765, filed on Aug. 28, 2008, entitled "PROTECTION OF A CIPHERING ALGORITHM," which is hereby incorporated by reference to the maximum extent allowable by law.

BACKGROUND OF THE INVENTION

1. Field of the Invention

The present disclosure generally relates to electronic circuits and, more specifically, to circuits executing digital data ciphering or deciphering functions.

The present disclosure more specifically applies to the protection of the execution of a ciphering or deciphering algorithm against attacks by fault injection.

2. Discussion of the Related Art

Ciphering algorithms are increasingly used in data processing and, in particular, to transmit data from one electronic equipment to another, be it for bank data (chip cards to be used with payment terminals), for the provision of multimedia data (toll television), the transmission of data over the Internet between several computers, etc.

The robustness of ciphering algorithms is likely to be put at risk by hackers attempting to discover the ciphering keys or, directly, the data. A category of so-called fault-injection attacks comprises disturbing the execution of the algorithm to deduce therefrom, by statistical analysis, the manipulated keys or data.

Countermeasures consisting of detecting a possible jump (caused by the injection of a fault) in the execution of an algorithm have already been provided. However, this detection is itself detectable by a hacker, for example, by analysis of the circuit power consumption. Further, the detection is dedicated to a specific behavior (detection of a jump). Moreover, most attacks are repetitive since they are based on a statistical analysis and countermeasures generally block the circuit, which can be detected by the hacker.

SUMMARY OF THE INVENTION

It would be desirable to have a mechanism for protecting a ciphering algorithm, which provides no information to a possible hacker as to the detection of a malfunction.

It would further be desirable to have a solution which is nevertheless compatible with the provision of information to the rest of the circuit about the detection of an error.

It would moreover be desirable to make sure that a disturbance occurring during an execution of the algorithm prevents the exploitation of subsequent executions.

To achieve all or part of these objects as well as others, at least one embodiment of the present invention provides a method for protecting the execution of a ciphering or deciphering algorithm against the introduction of a disturbance in a step implementing one or several first values obtained from second values supposed to be invariant and stored in a non-volatile memory in which, during an execution of the algorithm:

a current signature of the first values is calculated;

this current signature is combined with a reference signature previously stored in a non-volatile memory;

the result of this combination is taken into account at least in the step of the algorithm implementing said first values.

According to an embodiment of the present invention, the combination function is selected so that, in case of an identity between the two signatures, a resulting variable combined with the result of said step does not modify this result.

According to an embodiment of the present invention, said combination function is an XOR.

According to an embodiment of the present invention, the first and second values are identical.

According to an embodiment of the present invention, the first values are calculated from the second values and a random quantity.

According to an embodiment of the present invention, the first values correspond to substitution tables processed by the algorithm.

According to an embodiment of the present invention, the algorithm is of AES type.

According to an embodiment of the present invention:

first substitution tables are combined with a random value;

the current signature is calculated from the result of the previous combination;

the variable is calculated by combining the reference and current signatures as well as the random value; and the ciphering steps are executed with, as substitution tables, the combinations of the first tables with the variable.

According to an embodiment of the present invention, the algorithm is of DES type.

The present invention also provides an algorithmic processing electronic circuit.

The foregoing objects, features, and advantages of the present invention will be discussed in detail in the following non-limiting description of specific embodiments in connection with the accompanying drawings.

DETAILED DESCRIPTION

Figure 1:
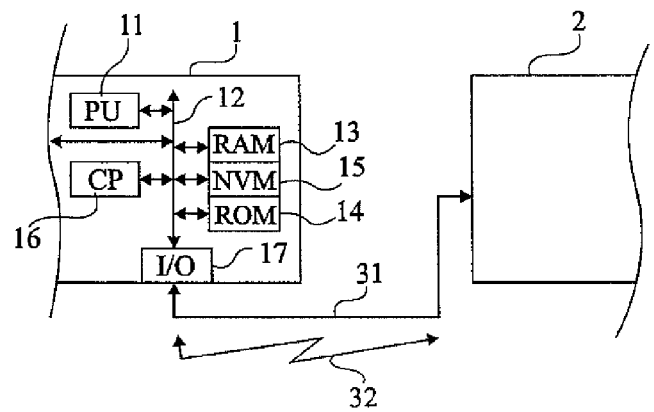
FIG. 1 is a block diagram of an electronic system of the type to which the present invention applies as an example.

The same elements have been designated with the same reference numerals in the different drawings.

For clarity, only those steps and elements which are useful to the understanding of the present invention have been shown and will be described. In particular, what exploitation is made of the ciphered or plain text by the electronic circuits has not been detailed, the present invention being compatible with any conventional exploitation. Further, the different elements of the electronic circuits to which the present invention may apply have not been detailed, the present invention being here again compatible with any digital processing circuit capable of exploiting ciphered or plain text, whatever its other functions.

FIG. 1 is a block diagram of an electronic system of the type to which the present invention applies as an example. A digital processing circuit 1 capable of ciphering and/or deciphering data is capable of transmitting by wire connection 31 or wireless connection 32 these data in ciphered form to a second circuit 2, which may be of the same type or different. The present invention applies to any electronic circuit 1 or 2, provided that it is able to process ciphered or plain text. Reference will be made hereafter to data ciphering and to a ciphering algorithm, but all that will be described easily transposes to a deciphering.

Electronic circuit 1 comprises, among others, a processing unit 11 (PU) capable of communicating via control, address, and data buses 12 with different memories, among which, for example, a RAM 13, a ROM 14, and a non-volatile memory 15 (NVM), rewritable or not, as well as with other circuits, not shown. In the example of FIG. 1, circuit 1 further comprises a specific crypto-processor 16 (CP) capable of implementing one or several data ciphering algorithms with of keys stored, for example, in one or several of the memories of circuit 1 or introduced from the outside via an interface 17 (I/O) of communication with the circuits external to circuit 1. As a variation, the ciphering algorithm is executed by unit 11. The algorithm is generally stored (during the circuit manufacturing or an initial programming) in ROM 14 (or in non-volatile memory 15). It is transferred for execution into volatile storage elements (RAM 13 or registers, not shown) also used for the storage of the processed data.

Figure 2:
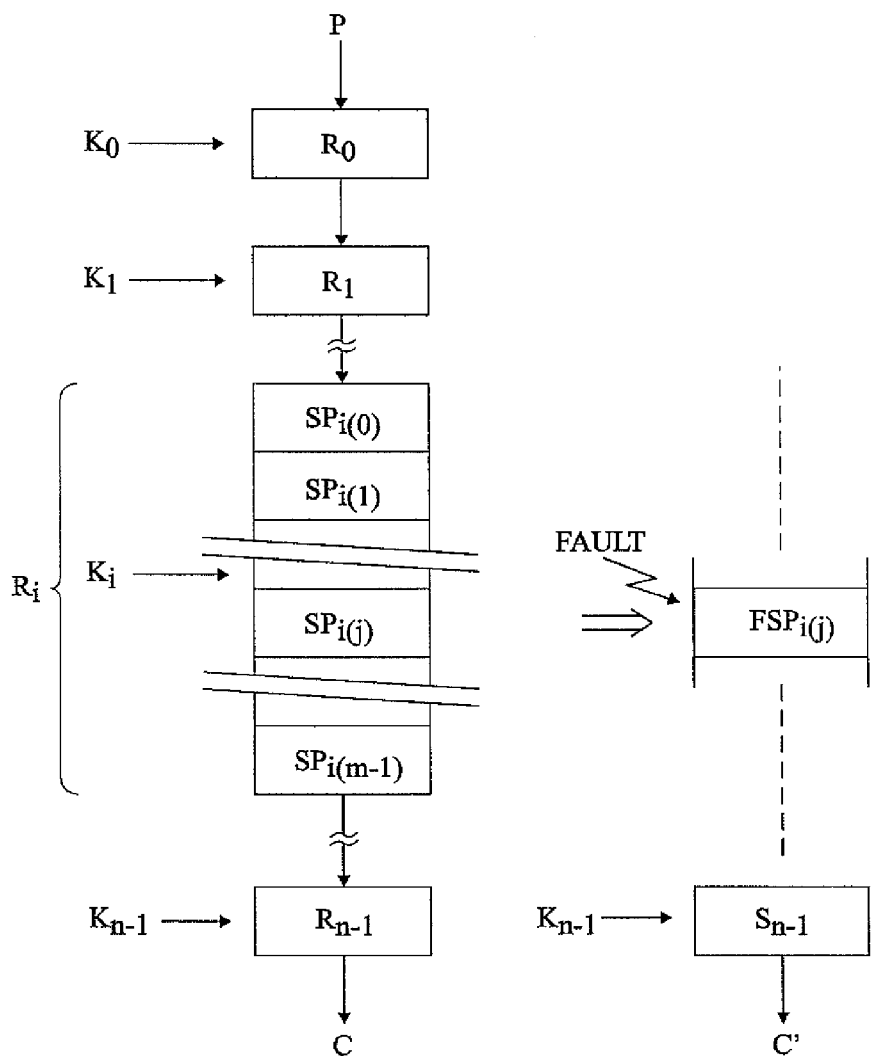
FIG. 2 is a simplified flowchart of a ciphering algorithm to which the present invention applies as an example.

FIG. 2 is a simplified flowchart of a ciphering algorithm of the type to which the present invention applies as an example.

A plain text P is submitted to several ciphering iterations or rounds $R_i$ (with i ranging between 0 and n−1) with, for each round, the application of a key or sub-key $K_i$, derived from a ciphering key. In the algorithms to which the present invention applies, each round uses at least one invariant value of the algorithm, that is, implements a processing which uses (possibly after transformation) one or several values, other than the keys, which do not change from one execution to another. These values are, for example, stored in non-volatile memory 14 or 15. In the example of FIG. 2, it is assumed that each round comprises sub-steps $SP_i(j)$, with j varying from 0 to m−1, and that at least one of these sub-steps (for example, $SP_i(j)$) is invariant for the execution of the algorithm, that is, uses an invariant value.

Such invariant parts are most often those targeted by fault injections since they more easily enable statistic exploitations of the obtained results. The left-hand portion of FIG. 2 illustrates a normal execution while its right-hand portion illustrates the injection of a fault (for example, an inversion of the state of certain bits of the invariant value) at step $SP_i(j)$. The injection of this fault results in a modification of the invariant codes of the algorithm, and the step is thus transformed into a step $FSP_i(j)$.

The algorithmic processing thus carries on for the next rounds all the way to the last one, so that the algorithm provides a ciphered result C' different from the result C which would have been obtained with no fault. The interpretation of distorted results is likely to lead a hacker to discover the manipulated secret quantities.

Figure 3:
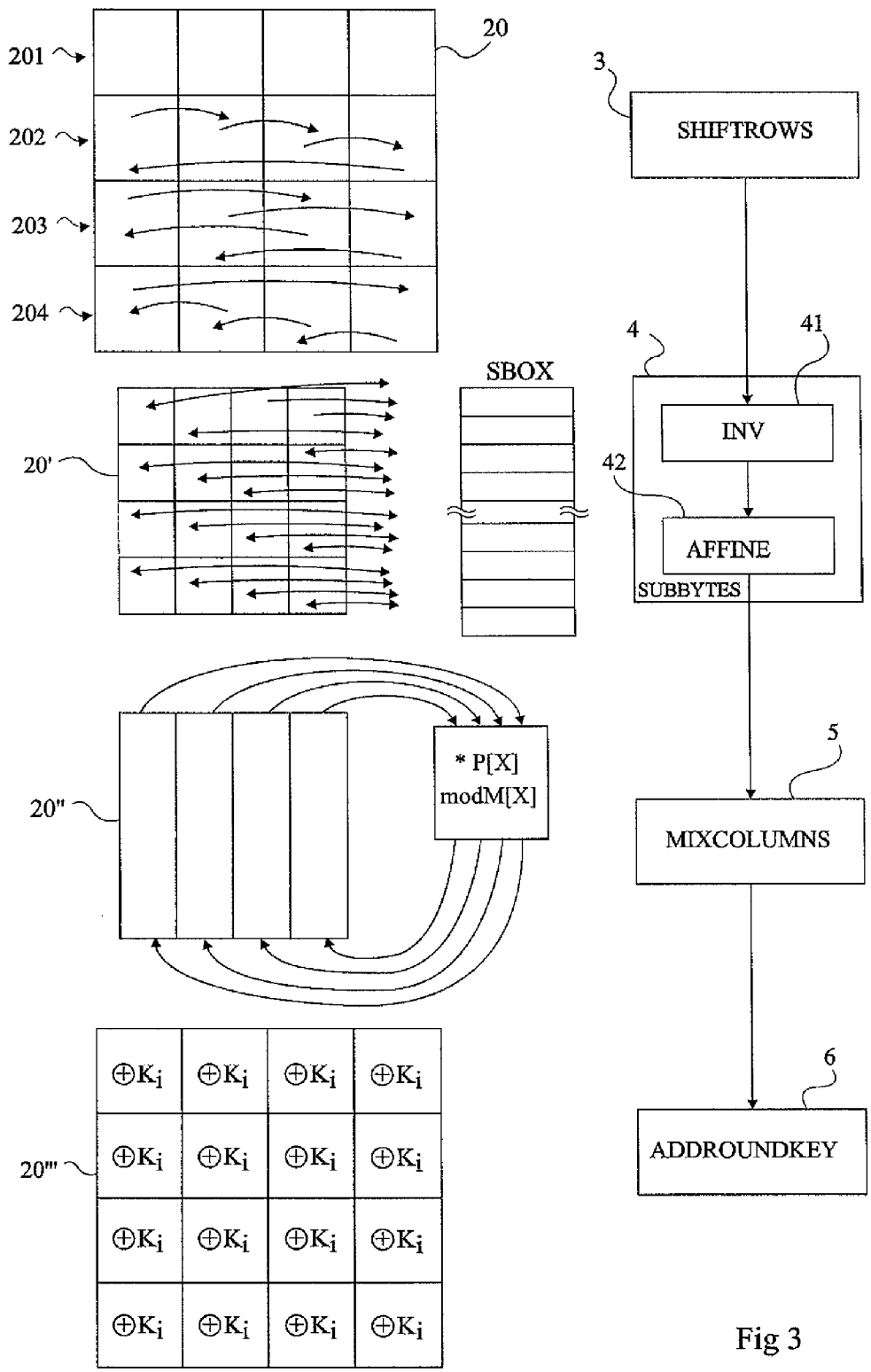
FIG. 3 illustrates the operation of an AES-type algorithm.

FIG. 3 illustrates, in a simplified flowchart facing examples of arrays of four lines and four columns of binary bytes to which the algorithm is applied, the main steps of a usual AES-type algorithm. As previously indicated, only the ciphering is described, the deciphering using the inverse transformations.

The AES algorithm ciphers a data word of a determined number of bits (for example, 128 bits) into another word of same size. The data to be ciphered are formed of several words resulting from a previous separation into words all having the same size. The ciphering (or deciphering) relies on a secret key having a length (generally, from 128 to 256 bits) which conditions the security of the ciphering.

In practice, each step of an AES-type algorithm processes an array of four lines and four columns (20) representing a word, each element of which is a byte of the word of 128 processed bits. To simplify the following description, reference will be made at each step to a state representing an array.

11 sub-keys are first generated from a secret key over 128, the sub-keys also each comprising 128 bits. More generally, n sub-keys $K_0, \ldots, K_i, \ldots, K_{n-1}$ (FIG. 2) of q bits each are derived from a key of a number q of bits. These sub-keys are intended to be used by the successive rounds of the algorithm.

A first phase, not shown, of the AES algorithm is a so-called "whitening" operation where the initial state is combined by XOR with first sub-key $K_0$.

In a second phase of the AES, several rounds or cycles of a same transformation involving, for each round, the state obtained at the previous round and a current sub-key $K_i$ are performed. The number of rounds of the transformation corresponds to n−2, that is, to the number of derived sub-keys, minus 2.

As illustrated in FIG. 3, each round transformation comprises four successively-applied operations, starting from an array 20 of four lines and four columns of binary bytes.

A first step (block 3, SHIFTROWS) comprises performing a rotation on the last three lines of array 20. First line 201 of array 20 remains unchanged. Second line 202 undergoes a rotation by one byte. Third line 203 undergoes a rotation by two bytes. Fourth line 204 undergoes a rotation by three bytes.

A second step (block 4, SUBBYTES) of the round transformation is a linear transformation in which each byte of array 20' forming the current state is replaced with its image taken from a substitution box (SBOX). Substitution box SBOX is obtained by two successive transformations. A first transformation (block 41, INV) comprises inverting the considered byte (the element of array 20') over the finite field of order $2^8$ (to correspond to the byte), with byte 00 forming its own image. This inversion is followed by an affine transformation (block 42, AFFINE).

Examples of non-linear substitution transformations such as discussed hereinabove are described in work "The Design of Rijndael" by Joan Daemen and Vincent Rijmen, published by Springer-Verlag (ISBN 3-540-42580-2) and in the AES standard (FIPS PUB 197).

The substitution boxes are based on invariant values. These tables are loaded into the memory from a non-volatile memory or calculated on the fly from an invariant part (of invariant coefficients or values) of the code of the algorithm.

The third step (block 5, MIXCOLUMNS) of the round transformation considers each column of array 20" resulting from the previous step as a polynomial over a finite field of order $2^8$, and multiplies each of these polynomials with a combination polynomial P[X] modulo a polynomial M[X].

The fourth and last step of the round transformation of rank i comprises applying sub-key $K_i$ to array 20" resulting from the previous step to obtain an array 20''', where each element of array 20" is combined by XOR, bitwise, with sub-key $K_i$ (block 6, ADDROUNDKEY). Step 6 is the same as step 2 of the first ciphering phase, however performed with a different sub-key.

The four steps of the round transformation are repeated n−2 times, that is, after step 6, it is returned to step 3 to perform a new round with a next key.

A third phase of the ciphering algorithm comprises one last round, slightly modified with respect to that illustrated in FIG. 3. In fact, the steps of the round transformation are repeated, but for the third one (MIXCOLUMNS). This amounts to successively performing steps corresponding to steps 3, 4, and 6 with last sub-key $K_{n-1}$.

Ciphered state C is thus obtained.

U.S. Pat. No. 7,403,620 (02-RO-048/B5532) describes an example of protection of an AES-type algorithm by random numbers. In this document, the substitution boxes (more specifically, affine transformations 42) are recalculated for each ciphering/deci-phering based on invariant data stored in the circuit and are used, on each execution, to recalculate the tables with the random quantity or quantities. The use of a masking with a random quantity improves the security of the algorithm against attacks by statistical analysis of the consumption of the electronic circuit which executes it. However, this algorithm remains sensitive to fault injections since, even if the provided result becomes an incorrect result, the hacker is capable of noticing whether or not his action has been effective.

In the following embodiments, it is provided to calculate, for an algorithm in which part of the execution code is invariant (for example, SBOX-type substitution boxes or their invariant data in case of a masking with random numbers), a prior signature of the invariant values. This signature is stored in non-volatile memory 14 or 15. When the algorithm is being executed, the recorded signature is combined with a signature calculated with the current values of the substitution boxes. The combination function is selected so that, in case of an identity between the two signatures, a resulting variable combined with the result of the transformation does not modify this result. However, if the current signature is modified, this results in a modification of the result of the round transformation, and thus in a propagation of the error on the next rounds without the hacker noticing it.

Figure 4:
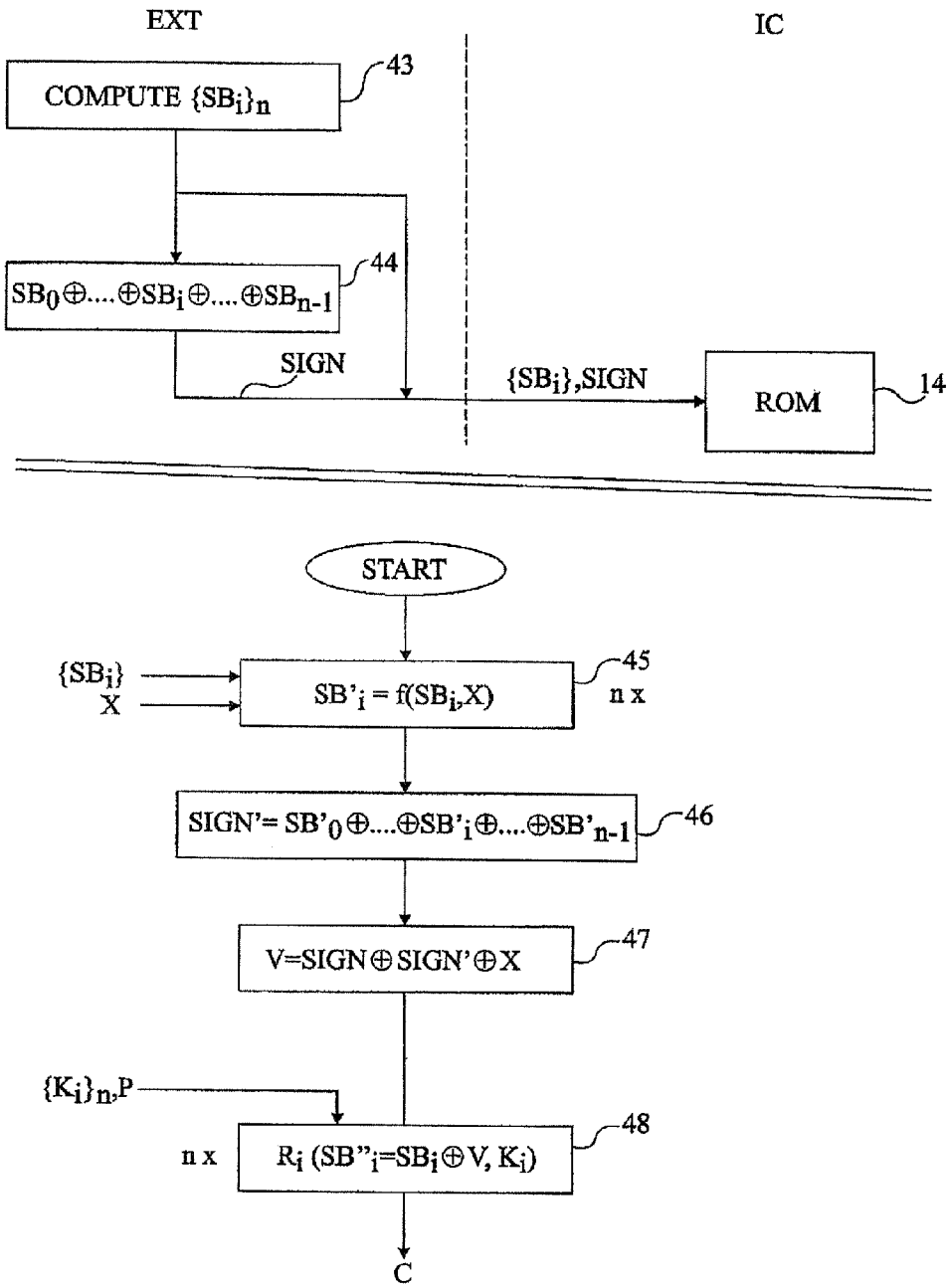
FIG. 4 is a flowchart illustrating an embodiment of the provided protection.

FIG. 4 illustrates in the form of blocks an embodiment of such a ciphering method applied to an AES-type algorithm.

Before the electronic circuit is put into service, the invariant values of the n substitution boxes $SB_i$ to be used are calculated (block 43, COMPUTE $\{SB_i\}_n$) to be stored in a ROM (for example, in memory 14, FIG. 1). In the example of AES, two boxes are generally used (one for the ciphering, the other one for the deciphering). This calculation is for example carried out outside EXT of the circuit by a programming tool. Further, a signature SIGN of these boxes is calculated, for example, by XOR combination of all their values (block 44, $SB_0 \oplus \ldots SB_i \oplus \ldots SB_{n-1}$). Signature SIGN is also stored in ROM 14 or in non-volatile memory 15 of integrated circuit IC.

After, during the execution of the AES algorithm, the substitution boxes are, in the example of FIG. 4, combined with a random number X by a function f as described in the previously-mentioned document (block 45, $SB'_i = f(SB_i, X)$). Then, a current signature SIGN' is calculated (block 46, $SIGN' = SB'_0 \oplus \ldots SB'_i \oplus \ldots SB'_{n-1}$) based on the individual values of the obtained substitution boxes $SB'_i$. A variable V is then calculated (block 47, $V = SIGN \oplus SIGN' \oplus X$) as being the XOR-type combination (bitwise sum) of the current and prerecorded signatures as well as of the random value.

Then, the steps of the different round transformations $R_i$ of the AES algorithm are executed with, as substitution boxes $SB''_i$, the combination of the respective values $SB_i$ with variable V (block 48, $R_i (SB''_i = SB_i \oplus V, K_i)$).

In case of a modification of any of substitution boxes $SB_i$ (or $SB'_i$), the combination of value $SB'_i$ and of variable V does not provide the expected value $SB''_i$ for the substitution box. The corresponding round transformation then provides a different ciphered text. However, the algorithm executes normally for the rest and the hacker cannot notice that his fault injection has resulted in modifying an additional variable introducing an error into the result.

Further, this error propagates in the next iterations of the algorithm. Indeed, as long as the electronic circuit has not been reset and the original substitution boxes have not been reloaded or recalculated from the non-volatile memory, the current tables remain faulty. Now, even if the hacker injects no new fault and thus expects a coherent result with respect to the previous execution, variable V is modified at the next execution since the current signature is calculated with the faulty box of the previous execution. The error thus propagates through variable V to the next executions. Further, the modifications that it propagates are unpredictable for the hacker. This phenomenon is amplified in case of a masking with a random quantity X which changes on each execution.

Thus, the proper operation of the algorithm is disabled even for subsequent executions from the moment that a disturbance has occurred.

In case of a masking with a random quantity by using XOR as function f, it will be ascertained, at step 48, to take the original box ($SB_i$) to avoid unmasking the box in the result ($SB''_i$). Indeed, the random value is present in variable V and a combination ($SB''_i = SB_i \oplus V$, $K_i$) would cancel the effects of the random quantity.

According to another variation, the combination function used at step 47 is different from function f used for the masking with the random quantity. For example, step 47 may be 1+(SIGN−SIGN')*X or ((SIGN+SIGN')/2)−SIGN+X. The combination function used at step 48 needs however be identical or at least have the same result as function f since at step 48, the ciphering algorithm is restored as if there had been no intervention of variable V.

As a variation, the invariant data of the AES algorithm taken into account for the signature calculation are the coefficients of the combination polynomial P[X] of the third step (MIXCOLUMNS).

Figure 5:
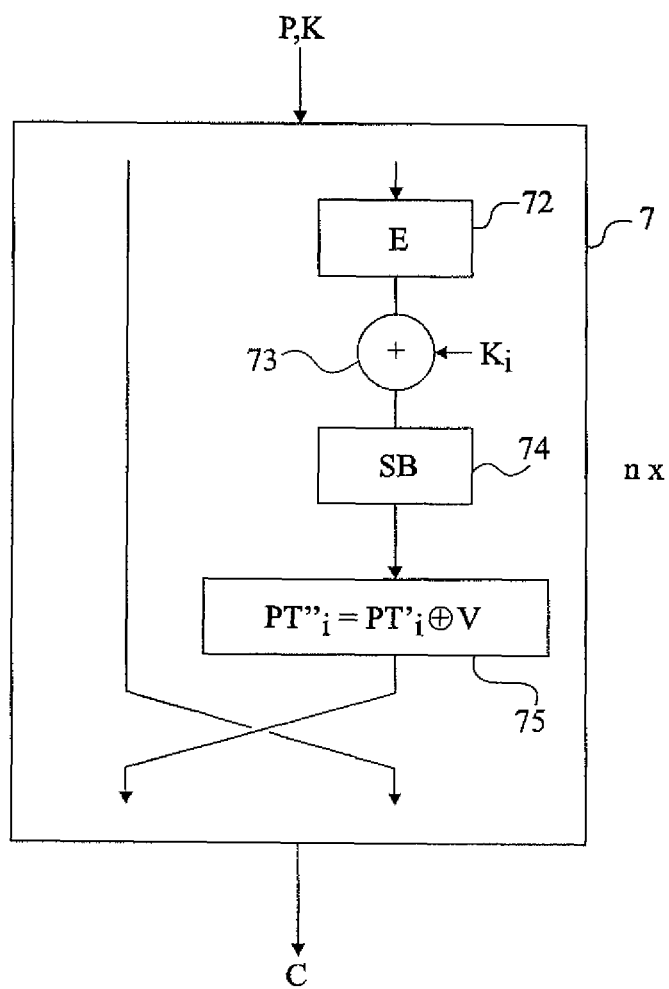
FIG. 5 is a partial flowchart illustrating an embodiment applied to a DES-type algorithm.

FIG. 5 illustrates an embodiment applied to a DES-type algorithm.

The DES algorithm is an algorithm of ciphering by blocks permuting, from one round transformation to the next round transformation, the processing of the left-hand portion and of the right-hand portion of the message to be ciphered. FIG. 5 shows a round transformation 7 which comprises an expansion (block 72, E) of a word representing the right-hand portion of half of a word to be ciphered. The result of this expansion function is mixed (bitwise addition 73) with a sub-key $K_i$ assigned to the considered round. Then, the result of the combination is processed by substitution boxes SB (block 74). Then, the outputs of the substitution boxes are reorganized according to an invariant permutation table $PT_i$. This table is noted $PT_i$ if it corresponds to the original table, $PT'_i$ if it corresponds to the current value (likely to have been disturbed). The signature may be implemented on the permutation tables which form an invariant for the execution of the algorithm. Current table $PT'_i$ is then combined (block 75, $PT''_i = PT'_i + V$) with variable V calculated based on the signatures as described previously to obtain table $PT''_i$ applied to the right-hand portion of the word. The rest of the operation can be deduced from usual operation of the DES and from what has been discussed previously in relation with the AES algorithm.

An advantage of the described embodiments is that they enable to alter the operation of the algorithm transparently for the user as soon as a disturbance occurs.

Another advantage is that the algorithm remains altered until the circuit is reset, more generally, until the invariant which is attached thereto is reloaded or recalculated from a non-volatile memory.

Another advantage is that the algorithm is only slightly modified.

The implementation of the described method translates as the fact that an execution of the algorithm, subsequent to an execution in which a fault has been injected, provides an erroneous result (error propagation), even with no new fault injection, as long as the original invariant values of the algorithm have not been reloaded (for example, by resetting of the circuit).

It should be noted that the described method protects the execution of an algorithm against fault injections, be they incidental or deliberate. Even for faults linked to an incidental disturbance of the circuit operation, it may be advantageous to provide for the subsequent operation to be disturbed to avoid any adverse consequence on the confidentiality of the keys.

Various embodiments have been described. Various alterations and modifications will occur to those skilled in the art. In particular, the present invention has been described in relation with an example of XOR combination function. However, other functions of combination of the invariant and of the signature may be considered, provided to respect the described functionalities. For example, the signature may be a CRC (cyclic redundancy check) and the combination may be a subtraction. According to the used combination function, it may be provided for variable V to take, in normal operation, a value different from zero. Finally, the practical implementation of the present invention, by modifying the software code of an algorithm or of a state machine in wired logic executing it, is within the abilities of those skilled in the art based on the functional indications given hereinabove. Embodiments of the present invention, for example, apply to processors integrated in chip cards, in secure platforms, and more generally in any ciphering or deciphering circuit.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting the execution by an electronic circuit of a ciphering or deciphering algorithm against the introduction of a disturbance, wherein, during an execution of the algorithm:
    first values are calculated as a function of second values, stored in a non-volatile memory, and a random value;
    a current signature of the first values is calculated by the electronic circuit;
    the current signature is combined by the electronic circuit with a reference signature, previously stored in a non-volatile memory, and the random value to provide a variable; and
    at least one round of the algorithm is executed using the variable and the second values, wherein the disturbance does not result in information as to the detection of a malfunction being provided to a hacker.

2. The method of claim 1, wherein the first and second values are identical.

3. The method of claim 1, wherein the first values correspond to substitution tables processed by the algorithm.

4. The method of claim 3, applied to an AES algorithm.

5. The method of claim 4, wherein:
    first substitution boxes are combined with a random value;
    the current signature is calculated from the result of the previous combination; and
    the ciphering steps are executed with, as substitution boxes, the combinations of the first tables with the variable.

6. The method of claim 1, applied to a DES algorithm.

7. An algorithmic processing electronic circuit capable of implementing the method of claim 1.

8. A method for protecting the execution by an electronic circuit of a ciphering or deciphering algorithm against fault injection, comprising:
    calculating, by the electronic circuit, first substitution boxes as a function of second substitution boxes and a random value, wherein the second substitution boxes were previously stored in a memory;
    calculating, by the electronic circuit, a current signature of the first substitution boxes;
    calculating, by the electronic circuit, a variable as a function of the current signature and a reference signature calculated from the second substitution boxes; and
    executing, by the electronic circuit, at least one round of the algorithm using the variable and the second substitution boxes, wherein fault injection does not result in information as to the detection of a malfunction being provided to a hacker.

9. A method as defined in claim 8, wherein the first and second substitution boxes are identical.

10. A method as defined in claim 8, wherein the current signature is a combination of the first substitution boxes.

11. A method as defined in claim 8, wherein calculating a variable includes combining the current and reference signatures and the random value.

12. An electronic circuit comprising a processing unit and a memory containing instructions that, when executed by the processing unit, perform a method for protecting execution of a ciphering or deciphering algorithm against fault injection, the instructions configured to:
    calculate first substitution boxes as a function of second substitution boxes and a random value, wherein the second substitution boxes were previously stored in a memory;
    calculate a current signature of the first substitution boxes;
    calculate a variable as a function of the current signature and a reference signature calculated from the second substitution boxes; and
    execute at least one round of the algorithm using the variable and the second substitution boxes, wherein fault injection does not result in information as to the detection of a malfunction being provided to a hacker.

13. An electronic circuit as defined in claim 12, wherein the first and second substitution boxes are identical.

14. An electronic circuit as defined in claim 12, wherein the current signature is a combination of the first substitution boxes.

15. An electronic circuit as defined in claim 12, wherein the variable is calculated by combining the current and reference signatures and the random value.

* * * * *